(12) United States Patent
Tannenbaum

(10) Patent No.: US 8,160,972 B1
(45) Date of Patent: Apr. 17, 2012

(54) TRAVELER'S PACKAGE PICK-UP AND DELIVERY SERVICE

(75) Inventor: Mary C. Tannenbaum, Dallas, TX (US)

(73) Assignee: Union Beach L.P., Dallas, TX (US)

( * ) Notice: Subject to any disclaimer, the term of this patent is extended or adjusted under 35 U.S.C. 154(b) by 618 days.

(21) Appl. No.: 12/119,058

(22) Filed: May 12, 2008

(51) Int. Cl.
*G06Q 30/00* (2012.01)
(52) U.S. Cl. ........................................ 705/336
(58) Field of Classification Search ........... 705/1, 336
See application file for complete search history.

(56) References Cited

U.S. PATENT DOCUMENTS

| 6,050,493 | A * | 4/2000 | Fertig | 235/487 |
| 2002/0169682 | A1* | 11/2002 | Capek et al. | 705/26 |
| 2003/0126030 | A1* | 7/2003 | Hungerford, III | 705/26 |
| 2005/0119948 | A1* | 6/2005 | Musgrove | 705/27 |

OTHER PUBLICATIONS

Fox, Bruce. "Not Just the Design is Incredible." Chain Store Age Executive. Jul. 1994. pp. 89-95.*

* cited by examiner

*Primary Examiner* — John Hayes
*Assistant Examiner* — Allen J Jung
(74) *Attorney, Agent, or Firm* — Fulbright & Jaworski L.L.P.

(57) ABSTRACT

A traveler can subscribe to a pick-up service (consolidator) that will pick-up purchases made at any number of different locations while the traveler is visiting a location, or series of locations. The consolidator then bundles all of the purchases from the various locations into appropriate sized packages for delivery to the traveler's desired location. The consolidator gathers the various purchases over a period of time and coordinates ultimate delivery to the traveler according to a prearranged itinerary of the traveler.

35 Claims, 5 Drawing Sheets

TRAVELER'S PACKAGE PICK-UP AND DELIVERY SERVICE

CROSS-REFERENCE TO RELATED APPLICATIONS

This application is related to commonly-owned, concurrently filed, co-pending U.S. patent application titled EMERGENT DELIVERY OF PRESCRIPTION MEDICATION TO TRAVELERS (Ser. No. 12/119,130) hereby incorporated by reference herein. This application is also related to commonly-owned, co-pending application Ser. No. 11/736,266 titled SYSTEM AND METHOD FOR DELAYED PURCHASING, filed Apr. 17, 2007 which application is hereby incorporated by reference herein.

TECHNICAL FIELD

This disclosure relates to delivery services and more particularly to systems and methods for providing convenient pick-up service for travelers and others who are shopping in a variety of places over a course of time.

BACKGROUND OF THE INVENTION

It is a common practice for travelers who are away from home to purchase items for themselves and for others while they move from place to place. Several inconveniences arise that make it difficult, and sometime even impossible, to purchase desired items in such situations.

Often the merchant simply has no convenient mechanism to wrap and/or have the item picked up for shipping to a location foreign to the merchant. This comes about for a variety of reasons. For example, the small (or sometimes large) size of the purchase makes it impractical for the merchant to arrange for shipping. Sometimes language difficulties prevent adequate communication thereby impeding shipment of the prospective purchase. Sometimes the inability of the merchant to know the shipping and/or packaging costs prevents the transaction from occurring. Often the shipping costs for a particular item far outweigh the value of the item.

Other factors may also interfere with the ability of having purchased goods shipped to a purchaser's destination of choice. One such factor is that the purchaser will be away from home for an extended period and thus no one is available to receive the purchase. This often happens at the beginning of a trip or vacation and thus the purchaser must forego buying the item(s) or must carry the purchases for the remainder of the trip. This is inconvenient at best. Also, sometimes it is desired to send the purchase to an address different from the home address and this can cause problems because the delivery address does not match the credit card address.

Further problems result when import and/or customs duties need to be paid, or when import clearances must be obtained. In such situations, unless the purchaser is sophisticated, the inconvenience of arranging for these governmentally imposed requirements often outweigh the desirability of the purchase.

BRIEF SUMMARY OF THE INVENTION

The present invention is directed to which a traveler can subscribe to a pick-up service (consolidator) that will pick-up purchases made at any number of different locations while the traveler is visiting a location, or series of locations. The consolidator then bundles all of the purchases from the various locations into appropriate sized packages for delivery to the traveler's desired location. The consolidator gathers the various purchases over a period of time and coordinates ultimate delivery to the traveler according to a pre-arranged itinerary of the traveler. The consolidation can occur on a country-by-country basis or across countries, all as pre-arranged between the consolidator and the traveler. In a preferred embodiment, the traveler can make arrangements with the consolidator, via a web site or otherwise, for payment of both the shipping costs and any import taxes.

In one embodiment, the traveler receives from the consolidator an identification number and either the merchant or the traveler contacts the consolidator (by telephone, web site, e-mail, text message, etc.) with the location of each purchase. The consolidator then picks up the purchases, as soon as practical, after such notification, and holds the purchases for consolidation with other purchases. The consolidator, either on a pre-arranged date (for example, the day after the traveler's trip is scheduled to end) or after notification by the traveler, then packages the items for delivery.

In one embodiment, the traveler may identify certain purchases for delivery to a third party. The third party's name and address can be supplied to the consolidator ahead of time or even after the item is picked up by the consolidator. All the items for a particular third party can be packaged together, regardless from where they are bought.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
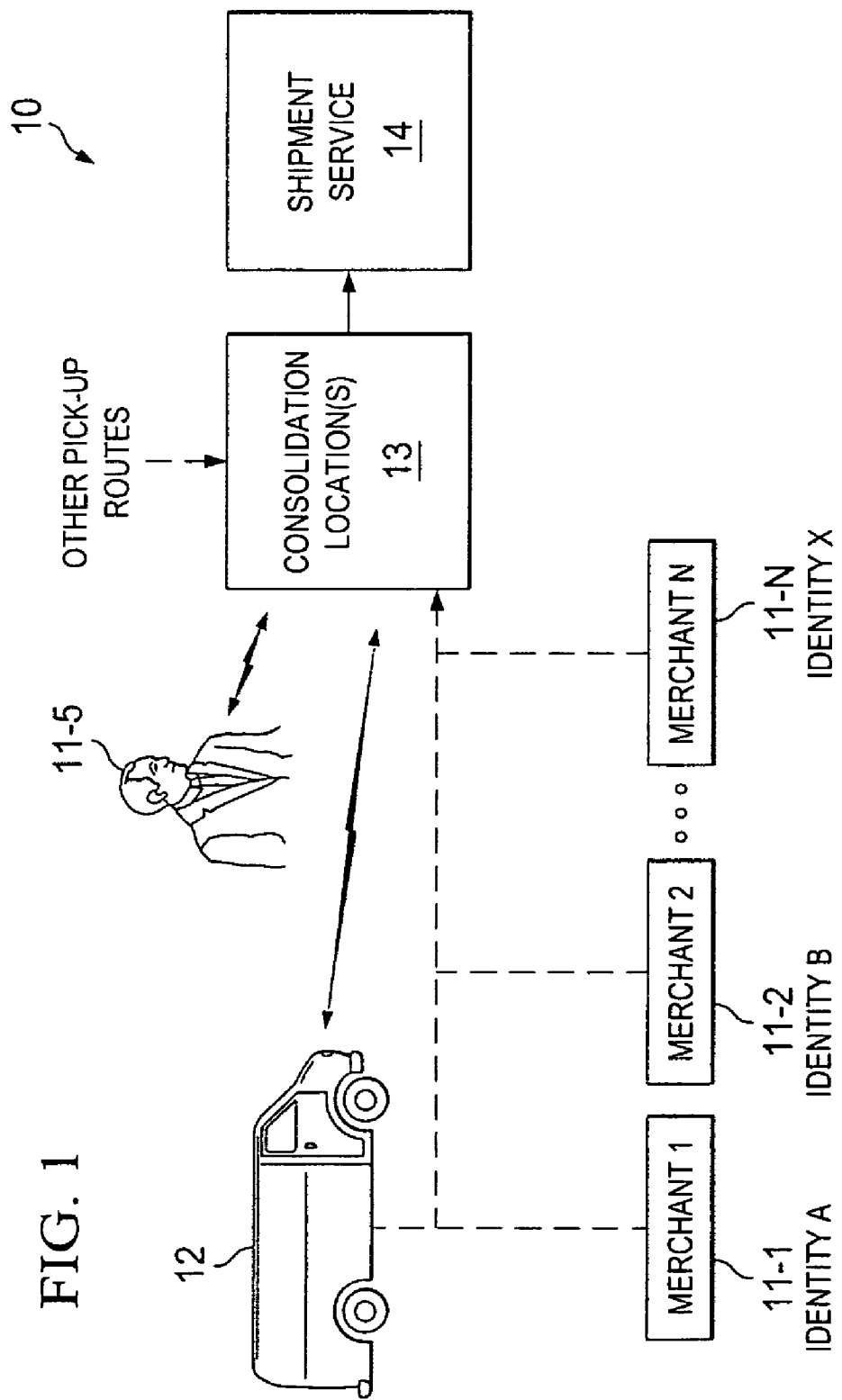
FIG. 1 shows one embodiment of a system for retrieval of items selected by a user at various locations in accordance with the teachings of the invention.

FIG. 1 shows one embodiment of a system 10 for retrieval of items selected by a user at various locations, such as locations 11-1 to 11-N. As shown, user 15 moves from location to location shopping, sightseeing, etc. In the embodiment shown, user 15 is a traveler in a country away from his/her home country. While it is envisioned that this is preferred usage of the systems and method of this invention, the concepts discussed herein will work when the user is in his/her own country and even in his/her own city. The concepts discussed herein will work also when the traveler is visiting several countries and is especially useful when the traveler is away from "home" for an extended period of time.

When the traveler, such as traveler 15, decides to buy (or otherwise take possession of) an item (or items) at a particular location, such as at location 11-1, the item is selected and arrangement made with the merchant at location 11-1 for the purchaser to take possession of the item. Instead of taking immediate possession of the item, the item is left with the merchant temporarily. In one embodiment, as will be discussed in more detail hereinafter, a tag can be placed on the item for identification purposes. In any event, the item is identified as belonging to that particular traveler.

In one embodiment, the traveler, or the merchant, at some point thereafter, notifies the consolidator, such as consolidator 13 for example, by providing the consolidator with the name and address of the merchant, or an identity of the merchant, such as identity A, if the merchant is registered with the consolidator. Possibly the identity and/or size, weight, etc. of the item is also provided to the consolidator. Typically the consolidator is notified immediately upon selection of the item but this is not necessary. This notification can be, for example, by a telephone call, an e-mail, a text message or by logging onto a web site maintained by the consolidator or by a service who then would hire a pick-up service to retrieve the item(s) at the various locations. Note that, as will be discussed, not all items need be retrieved during the same day or by the same pick-up van, such as van 12 or service. In fact, it would be rare to find that all the items that were to be consolidated were picked-up by the same van on the same day. Once the item(s) are retrieved from the various locations, they are stored until it is time to consolidate all of the items for delivery to the traveler, for example by shipment service 14.

Note that, as will be discussed, consolidation of the items for delivery does not mean that all items must be placed in a single package. Consolidation in this context means that the items to be shipped to the traveler are packaged by the retrieval service for the most economical shipment consistent with their respective sizes and in keeping the nature of the item(s). Some items will need to be packed carefully due to their fragile nature and others will have to be crated because of their size and/or weight and/or shape. Some items will require special handling because of import or customs requirements. Some items will actually be shipped to different destinations, perhaps even at different times. Nonetheless, all of the items that are to be shipped to the traveler (or at the traveler's directions) are done so as a consolidated whole.

Figure 2:
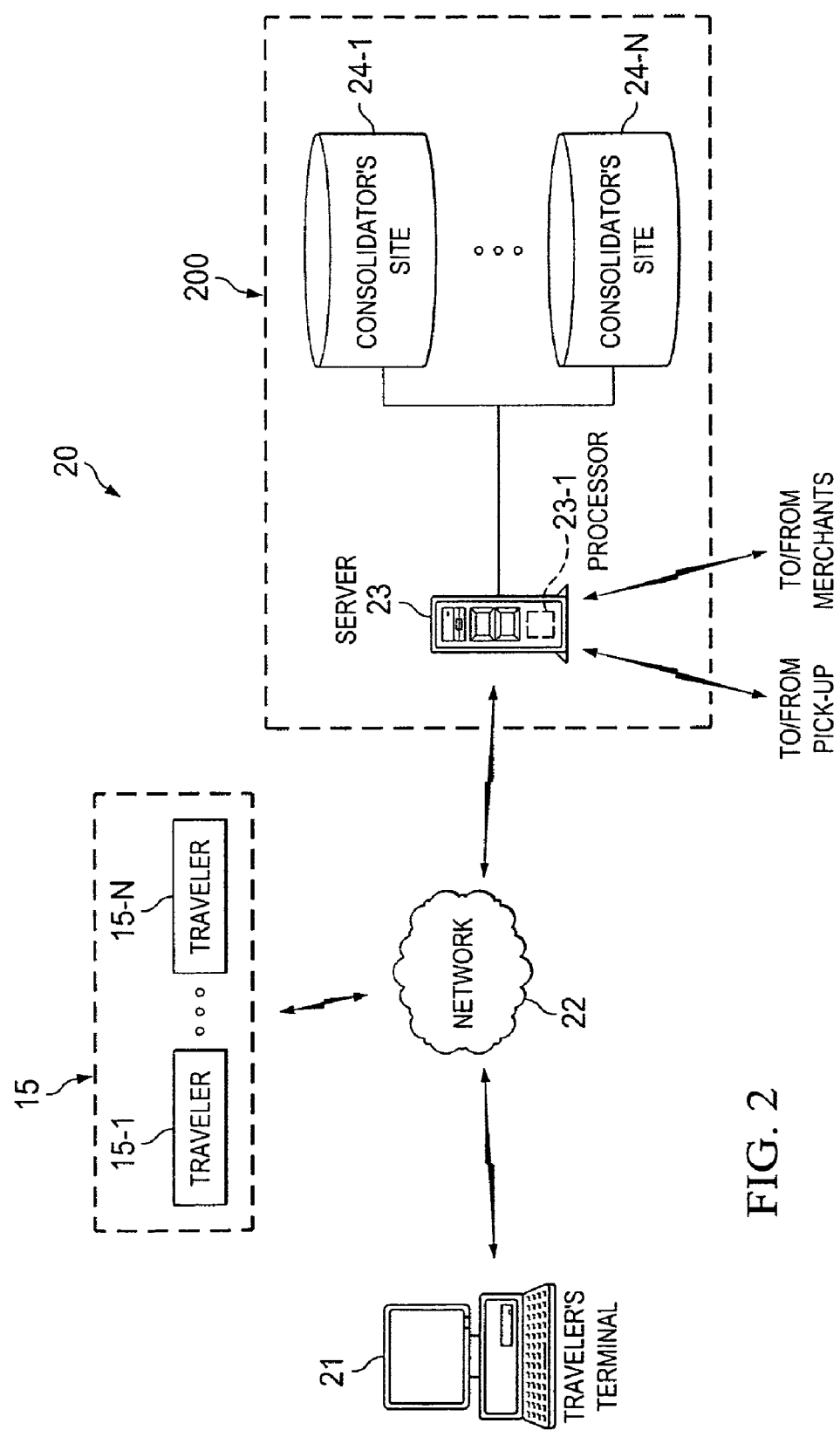
FIG. 2 shows one embodiment of a system for enabling the system illustrated in FIG. 1.

FIG. 2 shows one embodiment of a system 20 for enabling the operation of system 10 as illustrated in FIG. 1. As will be discussed, the traveler, either from home or from a terminal (or telephone) available while traveling, arranges with a service, such as service 200, to retrieve various items to be identified from time to time by the traveler. Network 22 is an example of the communication network that can be used for this purpose. This communication can be voice, data or a combination thereof, and can be wireline or wireless or a combination thereof. Service 200 then stores the parameters pertaining to each user in a data base, such as data base 24-1 to 24-N. The system for maintaining the data base and coordinating the retrieval, consolidation and subsequent delivery of the retrieved items to the traveler is controlled, for example, by one or more processors 23-1 which can be at a central location or distributed around the world.

Note that the service to the traveler, as contemplated by the disclosure herein, can be provided by a single integrated entity, or can be provided by a service company orchestrating operations by a number of substantially independent entities. One example of a distributed type of operation would be where a service provider coordinates the retrieval of items from the various merchants and performs storage and consolidation services with respect to the retrieved items. At some point in time, the service provider calls upon a delivery service to perform the actual delivery of the consolidated packages to the proper delivery location.

Figure 3:
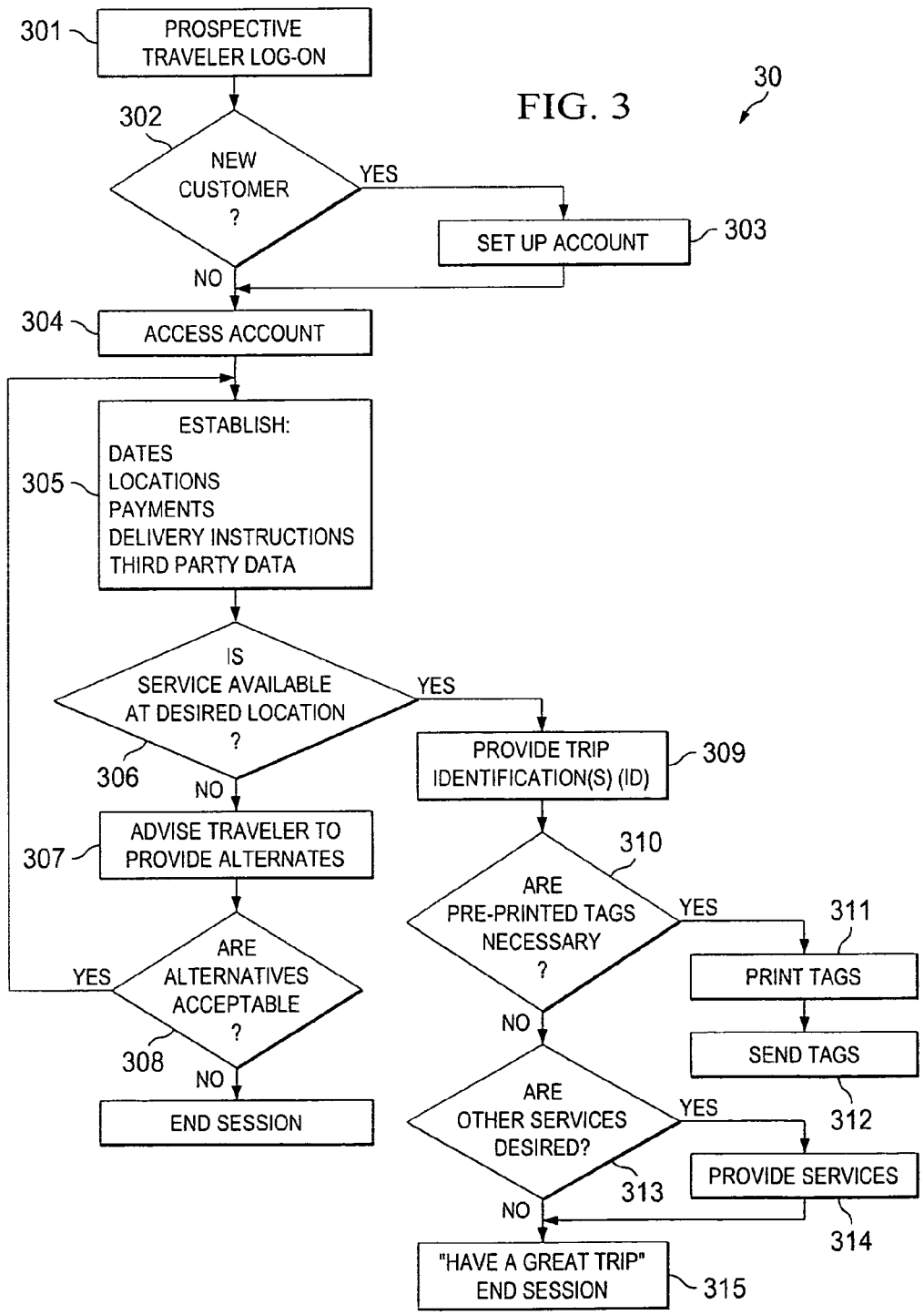
FIG. 3 shows one embodiment of a method for allowing a user to establish a relationship with the system of FIG. 2 for providing user-specific parameters to assist in the retrieval of items selected by the user at various locations.

FIG. 3 shows one embodiment 30 of a method for allowing a user to establish a relationship with the system of FIG. 2 for providing user-specific parameters to assist in the retrieval of items selected by the user at various locations. Process 301 controls the user (prospective traveler) login to a common website of a service provider, such as service provider 200, FIG. 2. As discussed above, this is but one method for initiating the service. Other methods could be a long-term subscription and it could be accommodated by a phone call-in or a combination of voice and data. In some situations, the traveler will only find out about the service from a merchant who then could gather the traveler's information or facilitate the traveler giving his/her information (as will be discussed below with respect to process 305) to the consolidation service.

Process 302 determines if the current prospective traveler is a current customer or a new customer. If a new customer, then process 303 sets up an account in the well-known manner. Passwords can be assigned, payment methods established and verified, etc.

Once an account is established, process 304 controls access to that account and in conjunction with process 305, the prospective traveler can establish parameters for one or more trips. These parameters can, for example, include: the dates for the trip, the itinerary, payment arrangements, delivery instructions and any third party delivery instructions. At this stage, if desired, the system could establish special storage, packaging, and delivery parameters for the prospective traveler. Note that while typically this process would be activated prior to a trip, it could be that modifications, or new information, can be added during the progress of an actual trip. For example, assume the traveler decides to purchase a wedding gift for a child (or other third party) and desired to have the item delivered three months hence to an address not yet known. That information can be entered into a data base, such as data base 24-1, controlled by system 200 (FIG. 2) and the wedding gift will be retrieved from the selling merchant, as will be discussed, by the consolidation service and held in storage until further instructions are received.

Process 306 determines if the retrieval service is available at the locations desired by the traveler. If not, then process 207 advises the traveler and attempts to provide alternative solutions. For example, the retrieval service may be available in France but not in Germany. One solution could be for the traveler to carry items from Germany to a location in France for retrieval. Or the traveler may have to make alternate arrangements to ship home the items obtained in Germany. When the system accepts a user's travel itinerary, the information pertaining to that user is made available to one or more consolidators operating in the region of interest. This can be accomplished using a common database, or by sending messages to the remote consolidator.

Process 309, assuming the retrieval service is available in at least one location to be visited by the traveler, provides trip identification to the traveler. This can in the form of an ID number, or even simply the user's name. In some situations, the user can be given a tag, such as a bar coded or magnetic stripped peel-off label, to place on the outside of all items that are to be retrieved. The data on the tag could be as simple as the user's ID or as complex as full instructions for storage and ultimate delivery. Different tags could be provided for different "home" delivery locations. This then would facilitate consolidation and ultimate delivery of the items(s). These tags could be mailed, but preferably they would be printed out by the prospective traveler based on data sent to the traveler by e-mail or otherwise, all as controlled by processes 310, 311 and 312.

Service provider 200 could, under control of processes 313 and 314, offer the traveler other services, such as insurance, medical care (as discussed in the above-identified co-pending application, etc. One service that process 314 could provide is a notification to various other service providers that this person will be traveling during a certain period. In this way, the person's newspapers could be stopped, the mail held, the dog-walker notified, appointments cancelled, etc. In some embodiments, the person's credit card companies can be notified so that their fraud detection system would expect the person to use their card at the location shown in the itinerary and not at the home location. To accomplish these "other services" the user, perhaps upon initial sign-up for the retrieval service, would provide credit card information as well as account information for newspapers and the like. The user could provide names and phone numbers of others, such as neighborhood watch services, local police, neighbors, gardening service, etc., so that the person's home will be watched and/or cared for while the person is traveling, all based upon a travel itinerary provided to system 200 and stored in database 24-1 to 24-N. When the session is finished, process 315 provides any additional information and/or greetings required.

Figure 4:
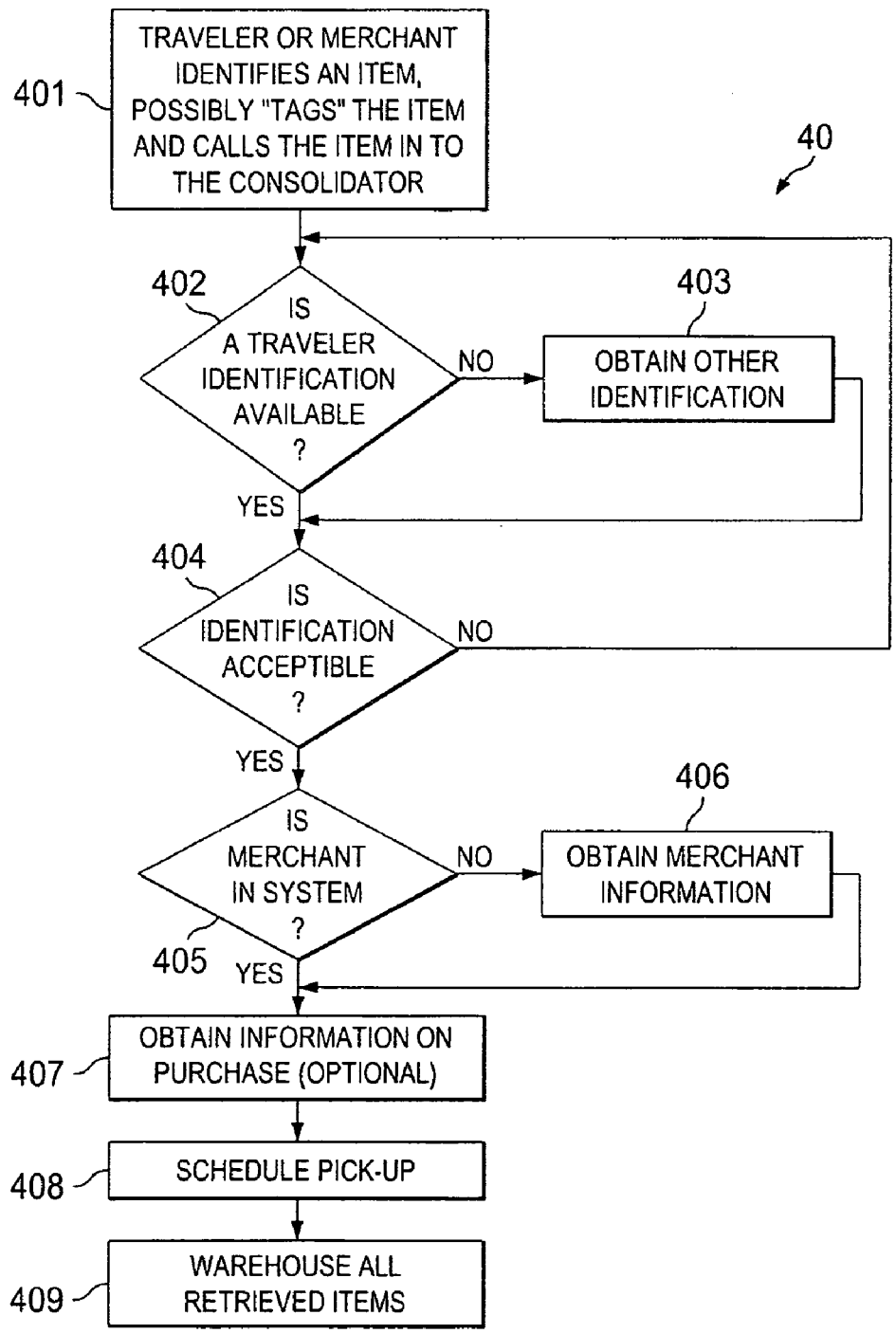
FIG. 4 shows one embodiment of a method for enabling a consolidator to retrieve items from various locations.

FIG. 4 shows one embodiment 40 of a method for enabling a consolidator to retrieve items from various locations. Process 401 controls the identification by the traveler (or merchant) after an item has been identified as one the traveler wishes to have retrieved and consolidated for delivery home or to one or more alternate designated locations in accordance with instructions given (or to be given) to the consolidation service. The traveler (or an agent working on behalf of the traveler) could telephone, e-mail, text message, etc. to the service provider that an item is available for retrieval.

Processes 402 and 403 work to obtain the identification of the traveler so that the item to be retrieved can be matched to the proper traveler for proper handling. In some situations, the consolidator would make scheduled pick-ups at certain merchants or other locations and in such situations the traveler may only be required to place an ID tag on the item and possibly could forego notifying the consolidator of the need to retrieve an item.

In situations where periodic pick-up is not available, then processes 405 and 406 and 407 coordinate obtaining the identity and location of the merchant and where required, an identity of the weight, size and description of the item to be retrieved. Where necessary, process 408 schedules pick-up of the item(s) and process 409 controls the warehousing (storage) of all retrieved items in accordance with data contained by system 200, or an equivalent of system 200 at a location local to region where the items are sold to the traveler.

Figure 5:
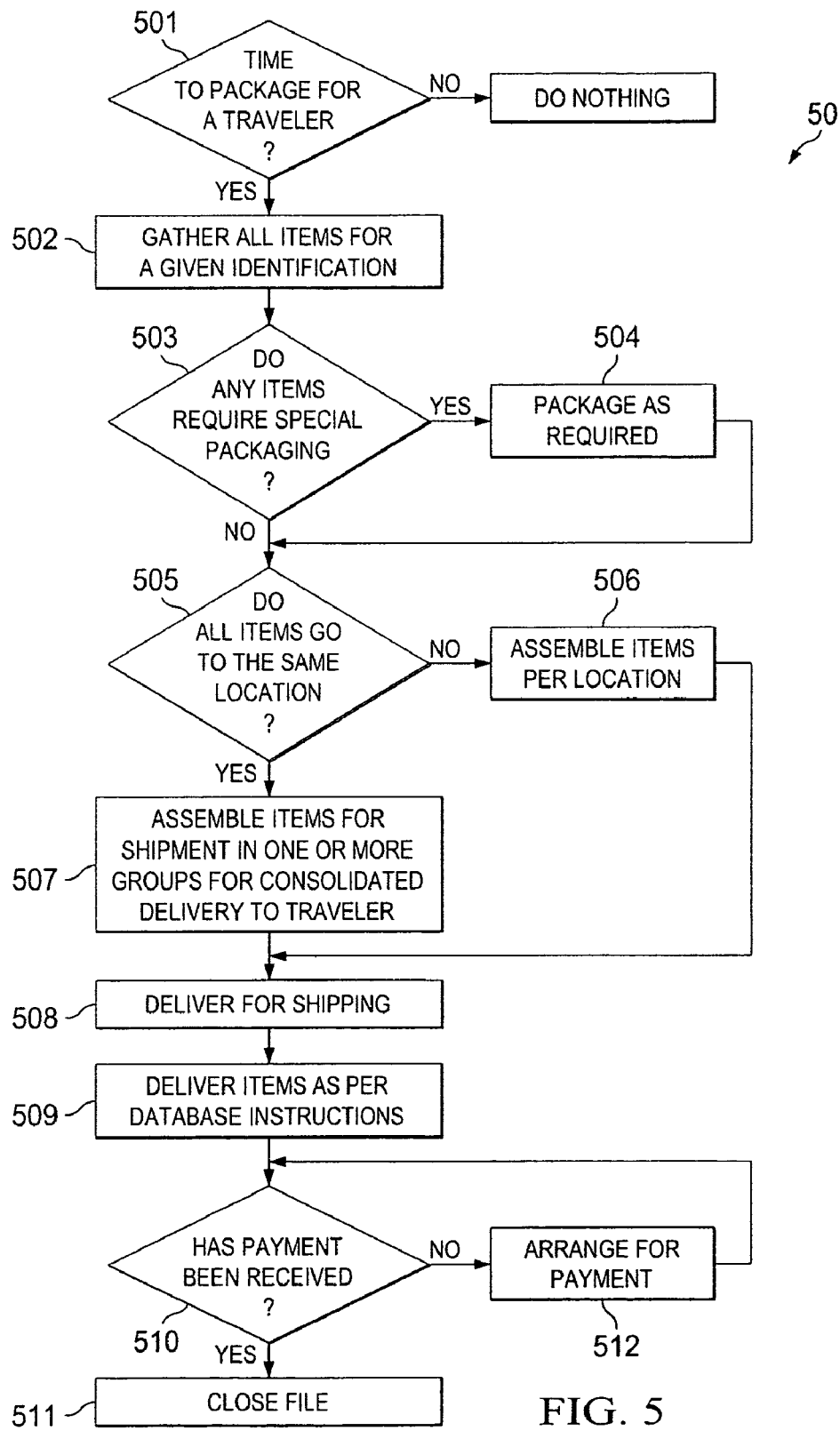
FIG. 5 shows one embodiment of a method for enabling a consolidator to hold items for a user for specific time periods and to group the items for a particular user for consolidated delivery.

FIG. 5 shows one embodiment 50 of a method for enabling a consolidator to hold items for a user for specific time periods and to group the items for a particular user for consolidated delivery. Process 501 determines if it is time to gather together a specific travelers items for delivery. This time could be a time fixed by the traveler prior to the trip, or could be a "log-on" message instructing service to deliver the items. The time could be triggered, if desired, based on the itinerary of the traveler. Note that for some extended trips where the traveler may be visiting many regions of the world, it might be desirable to consolidate regions, such as Europe, into one package (or set of packages) and based upon the itinerary of the traveler, actually ship the consolidated package(s) for a region, or for a country, back to a home country for storage (or even for delivery to a user-supplied delivery destination) even before the traveler is scheduled to return home. These arrangements, for example, could have been made when the prospective traveler initially entered the system as discussed with respect to FIG. 3.

When it is time to ship items to a desired destination, process 502 controls the gathering of all items retrieved for this specific traveler, based on the ID of the traveler. Processes 503 and 504 control the addition of any special packaging. This can be determined by the nature of the item, or by instructions obtained from either the merchant where the items were obtained or from the traveler or a combination thereof.

Process 505 determines if all of the items go to the same destination and if not then, process 506 assembles the items grouped by third-party delivery destination, while process 507 gathers the items grouped for delivery to the traveler's designated home delivery location. Note that delivery to all designated locations need not be shipped at the same time and some delivery may be delayed. This delayed delivery can be facilitated by keeping some items in the remote storage location for a longer period of time. In some situations, the items can be shipped "home" for storage in a more local storage location for later delivery. Sometimes the cost of shipping will dictate that all items be consolidated for delivery to a home location storage, or sorting facility, and then broken out for separate delivery or storage.

Process 508 controls the actual shipping and this can be part of the consolidation service or could be a separate enterprise. Process 509 controls the actual delivery as per instructions given by the traveler to system 200. Processes 510, 511 and 512 control billing and collecting for the various costs. These collection processes can be by the delivery service, the consolidation service or by a third-party service control enterprise, or by all three working in cooperation with each other.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controlling delivery of items purchased from merchant locations by a traveler while said traveler is at said merchant's physical location, said method performed under control of at least one processor, said method comprising:
    establishing by said traveler an ID to be used by said traveler, said establishing being under at least partial control of one of said processors;
    associating with said ID, by said at least one processor, at least one delivery location for delivery to said traveler of items identified by said traveler at various geographic locations;
    associating with said ID, by said at least one processor, a time frame for said delivery of said identified items;
    retrieving, by a shipping service consolidator, items identified by said traveler while said traveler was physically at various merchants locations within said geographic locations for consolidation; and
    delivering, by the shipping service consolidator, subsequent to said consolidation, said identified items to said delivery location at a conclusion of said time frame.

2. The method of claim 1 further comprising:
    electronically communicating said established ID to at least one consolidator operating in a specific one of said geographical locations, said electronic communication under at least partial control of one of said processors.

3. The method of claim 1 further comprising:
    identifying by said traveler a specific item at a specific merchant within said specific geographical location;
    retrieving by said consolidator said identified item from said specific merchant; and
    warehousing said retrieved item during said time frame.

4. The method of claim 3 wherein said retrieving comprises:
    communicating to said consolidator a specific merchant location at which said traveler has identified an item to be retrieved.

5. The method of claim 3 further comprising:
    arranging all warehoused items pertaining to said ID for consolidated delivery to said traveler when said time frame has expired.

6. The method of claim 3 wherein said associating comprises physically tagging an item with an identity keyed to said traveler.

7. The method of claim 6 wherein said tagging comprises storing data pertaining to said item and said traveler in a database.

8. The method of claim 1 wherein said geographic locations are different countries.

9. A processor controlled method for coordinating purchased item delivery, said method comprising:
    storing, in a database, by a shipping service during a particular period of time an ID of a traveler, each said accepted ID associated with data that indicates that said traveler associated with said ID has visited and purchased at least one item at a physical location of said particular merchant and has identified said at least one purchased item to be retrieved from a said physical location of said identified particular merchant, said storing being controlled by at least one processor;
    after a conclusion of said period of time, as determined under control of at least one processor, retrieving from all said identified merchants by said shipping service all said items identified for retrieval; and
    delivering to said traveler as a consolidated whole all said retrieved items.

10. The method of claim 9 wherein said delivering is to a destination identified to said shipping service by said traveler prior to said retrieving.

11. The method of claim 10 wherein said destination, said period of time and said ID of said traveler are all stored in a database prior to said shipping.

12. The method of claim 11 further comprising:
    packaging, by said shipping service, any retrieved items that require special packaging different from packaging in which said retrieved item was received from said identified merchant, said special packaging being sufficient to allow said item to transit from a retrieved location to a pre-identified final destination as said consolidated whole.

13. The method of claim 11 further comprising:
    separating retrieved ones of said items into different groups according to destinations identified for particular ones of said retrieved items; and
    wherein said delivery comprises enabling delivery of each said group to a destination pre-identified in said database for said group.

14. The method of claim 9 further comprising:
    billing said traveler for said retrieving, packaging and delivering independent from said merchant.

15. A system for facilitating delivery of items obtained by a traveler from a number of diverse merchant locations over a period of time, said system comprising:
    a central system for receiving instructions from said traveler, said instructions containing at least an identity of a merchant location at which at least one item purchased by said traveler while said traveler is physically at said merchant's location is available for pick-up;
    a dispatching system for controlling retrieval at said identified location of items identified by said traveler at said identified location; and
    means for physically consolidating said retrieved items in storage on a traveler by traveler basis such that retrieved items pertaining to a particular traveler are not shipped to a location selected by said traveler until a delivery time pre-established by said traveler.

16. The system of claim 15 wherein said warehousing system is further operable for consolidating all items received for said particular traveler for delivery to said particular traveler as a consolidated group.

17. The system of claim 16 further comprising:
    a delivery system for delivering said consolidated group of items to said user in accordance with said delivery instructions.

18. The system of claim 15 wherein said central system comprises a web site accessible by said users.

19. The system of claim 18 wherein said web site is operable for allowing travelers to pay for service offered pertaining to said consolidation and delivery.

20. A method of operating a delivery service, said method comprising:
    associating by said delivery service a potential traveler with an ID, said associating being under control of at least one processor;

storing in a database, on behalf of said delivery service, a time period during which said potential traveler will be within a particular geographical location, said time period stored in a database in association with said ID, wherein said storing is performed under control of said at least one processor;

during said time period picking up by said delivery service from various merchants within said geographical area items purchased from said merchants by said traveler while said traveler is physically at said merchant's location and which items remain in the custody of said merchants until said pick up, said items identified by said traveler using said traveler's ID;

holding each said picked up item under control of said delivery service until an end of said accepted time period; and delivering as a consolidated delivery all held items at a conclusion of said accepted time period.

21. A method for coordinating purchased item delivery, said method comprising:

storing, by a computer processor of a shipping service during a particular period of time, a merchant identification, each said stored merchant identification is associated with data that indicates that a particular purchaser has identified while said purchaser is at said identified merchant's physical location at least one item to be retrieved from said identified merchant;

Retrieving, by said shipping service, from said identified merchant's physical location at least one of said items; and delivering to said particular purchaser, under control of said shipping service, items retrieved from a plurality of identified merchants during said particular time period, said items delivered as a consolidated whole.

22. The method of claim 21 wherein said delivering is to a destination identified to said shipping service prior to said retrieving.

23. The method of claim 22 further comprising:
packaging, by said shipping service, any retrieved items that require special packaging different from packaging in which said retrieved item was received from said identified merchant, said special packaging being sufficient to allow said item to transit from a retrieved location to a pre-identified final destination.

24. The method of claim 22 further comprising:
separating retrieved ones of said items into different groups according to destinations identified for each said retrieved item; and
wherein said delivering comprises delivering each said group to a destination pre-identified for said group.

25. The method of claim 22 further comprising:
billing said purchaser for said retrieving, packaging and shipping independent from said merchant.

26. A method for facilitating delivery of items obtained by a user from a number of diverse locations over a period of time, said method comprising:

storing by a computer processor, at a central site, instructions from a plurality of users pertaining to delivery locations and delivery times for items to be obtained from said diverse locations, said items to be obtained having been identified by said users while said users were physically visiting said diverse locations;

coordinating, under control of a computer processor at said central site, pick-up of items identified from time to time by said users at identified locations, wherein said pick-up is performed by a shipping service; and maintaining said picked-up items in storage on a user by user basis such that picked-up items pertaining to a particular user are not shipped to said particular user until said received delivery time for said particular user.

27. The method of claim 26 further comprising:
consolidating all items picked-up for said particular user for delivery to said particular user as a consolidated group.

28. The method of claim 27 further comprising:
delivering said consolidated group of items to said user in accordance with received ones of said delivery instructions.

29. The method of claim 28 wherein said central site comprises a web site accessible by said users.

30. The method of claim 29 wherein said web site is operable for allowing users to pay for service offered pertaining to said consolidation and delivery.

31. A system for facilitating delivery of items obtained by a user from a number of diverse locations over a period of time, said system comprising:

a central system for receiving instructions from a plurality of users pertaining to delivery locations and delivery times for items to be obtained from said diverse locations, said items to be obtained having been identified by said users while said users were physically visiting said diverse locations;

a processor-controlled dispatching system for controlling retrieval, by a shipping service, of items identified from time to time by said users at identified locations; and a warehousing system for physically maintaining said retrieved items in storage on a user by user basis such that retrieved items pertaining to a particular user are not shipped to said particular user until said received delivery time for said particular user.

32. The system of claim 31 wherein said warehousing system is further operable for consolidating all items received for said particular user for delivery to said particular user as a consolidated group.

33. The system of claim 32 further comprising:
a delivery system for delivering said consolidated group of items to said user in accordance with said delivery instructions.

34. The system of claim 31 wherein said central system comprises a web site accessible by said users.

35. The system of claim 34 wherein said web site is operable for allowing users to pay for service offered pertaining to said consolidation and delivery.

\* \* \* \* \*